United States Patent
Genoni et al.

[11] Patent Number: 6,135,508
[45] Date of Patent: *Oct. 24, 2000

[54] PIPE FITTING WITH THERMOELECTRIC ADHESION

[75] Inventors: Massimo Genoni, Sasso Morelli; Cesare Vannini, Bologna; Guido Zappa, Seveso, all of Italy

[73] Assignee: Nupi S.p.A., Imola, Italy

[ * ] Notice: This patent issued on a continued prosecution application filed under 37 CFR 1.53(d), and is subject to the twenty year patent term provisions of 35 U.S.C. 154(a)(2).

[21] Appl. No.: 09/073,970

[22] Filed: May 7, 1998

[30] Foreign Application Priority Data

May 9, 1997 [IT] Italy ................... MI97A1081

[51] Int. Cl.[7] .................................................. F16L 47/02
[52] U.S. Cl. ................... 285/21.2; 285/21.1; 285/285.1; 156/304.3
[58] Field of Search ................... 285/21.1, 21.2, 285/285.1, 21; 156/304.1, 304.2, 304.3, 304.6, 499

[56] References Cited

U.S. PATENT DOCUMENTS

| | | | |
|---|---|---|---|
| 4,726,869 | 2/1988 | Matsui et al. | 156/304.2 X |
| 4,927,184 | 5/1990 | Bourjot et al. | 285/21.1 |
| 4,933,037 | 6/1990 | de Jong . | |
| 5,150,922 | 9/1992 | Nakashiba et al. | 285/21.2 |
| 5,254,824 | 10/1993 | Chamberlain et al. | 285/21.2 X |
| 5,286,952 | 2/1994 | McMills et al. | 285/21.2 X |
| 5,398,974 | 3/1995 | Mizukawa et al. | 285/21.2 |
| 5,786,054 | 7/1998 | Platusich et al. | 285/179 X |
| 5,810,958 | 9/1998 | Ragno et al. . | |

FOREIGN PATENT DOCUMENTS

| | | |
|---|---|---|
| 0585974 | 3/1994 | European Pat. Off. . |
| 683026 | 12/1993 | Switzerland . |

*Primary Examiner*—Anthony Knight
*Assistant Examiner*—Karlena D Schwing
*Attorney, Agent, or Firm*—Jacobson, Price, Holman & Stern, PLLC

[57] ABSTRACT

A pipe fitting for pipelines comprises at least one seating (12) for receiving the end of a pipe to be coupled. The seating surface which is intended to come into contact with the surface of the pipe end, is made of a material having a chemical adhesion reaction on reaching of a predetermined temperature and, around the seating (12), the pipe fitting incorporates an electric winding (14) for heating of the material when an electric current passes therethrough in order that said predetermined temperature can be reached. Advantageously, the seating (12) is formed in a sleeve (17) incorporating the electric winding (14) which in turn is incorporated into the pipe fitting body.

7 Claims, 1 Drawing Sheet

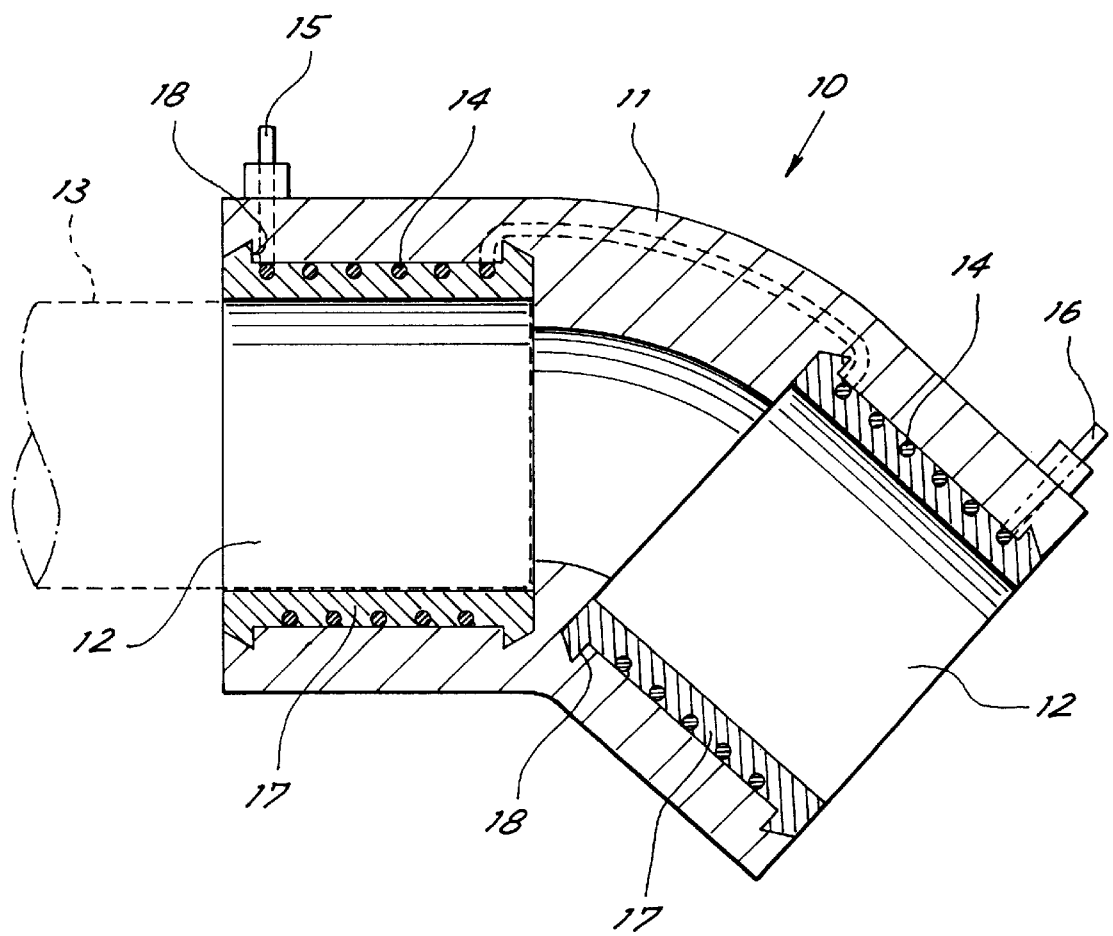

PIPE FITTING WITH THERMOELECTRIC ADHESION

BACKGROUND OF THE INVENTION

The present invention relates to thermoelectric pipe fittings for connecting pipes.

Pipe fittings are known in which an electric winding incorporated into a heat-fusible material is buried. Once the pipe end made of the same heat-fusible material as the pipe fitting has been inserted into the pipe fitting itself, for making a connection it is sufficient to cause running of a predetermined electric current through the winding. This gives rise to heating of the heat-fusible materials of the pipe fitting and the pipe. Thus the inner surface of the pipe fitting and outer surface of the pipe are melted together, thereby accomplishing a steady sealing.

Obviously, this connecting technique can be adopted only if the materials forming the pipe and pipe fitting are the same and suitable for heat-melting. When the materials are not identical, traditional systems involving a mechanical coupling are to be employed.

Due to the above, use of thermoelectric connecting methods is excluded or greatly complicated with many materials having very interesting physico-chemical characteristics for making ducts and pipe fittings having particular features. For instance, well known are plastic materials having excellent features in terms of resistance to aggressive fluids such as hydrocarbons, but of difficult or impossible heat sealing with materials such as the polyolefin-based ones, polyethylene for example.

For example materials resistant to hydrocarbons having interesting features but incapable of being heat-sealed to polyethylene are aliphatic polyketone having a perfectly alternate structure, polyamides, alloy of polyamides. The general object of the present invention is to eliminate the above mentioned drawbacks by providing a pipe fitting that, by electric heating, enables a pipe and a pipe fitting to be steadily and sealingly connected, even if they are not made of materials heat-sealabling to each other.

SUMMARY OF THE INVENTION

In view of the above object, in accordance with the invention a pipe fitting for pipelines has been devised which comprises at least one seating for receiving the end of a pipe to be coupled, the seating surface which is intended to come into contact with the surface of the pipe end being made of a material having a chemical adhesion reaction on reaching of a predetermined temperature, around the seating the pipe fitting incorporating an electric winding for heating the material when an electric current passes therethrough so that said predetermined temperature is reached.

Advantageously, the seating is formed in a sleeve at least partly incorporating the electric winding, which sleeve is in turn incorporated into the pipe fitting body.

For better explaining the innovatory principles of the present invention and the advantages it offers over the known art, a possible embodiment of the invention applying said innovatory principles will be given hereinafter, by way of non-limiting example, with the aid of the single accompanying drawing.

DETAILED DESCRIPTION OF THE INVENTION

With reference to the FIGURE, the longitudinal section of a pipe fitting, generally identified by 10 and made in accordance with the invention is therein diagrammatically shown.

By pipe fitting it is herein intended a general connecting element for a duct. For convenience, a mere bend will be described in detail, but the pipe fitting of the invention will be able to have any known shape for making elbows, sleeves, union tees, etc. A person skilled in the art will immediately understand how to apply the invention principles to a pipe fitting of any known shape among those used in traditional heat-fusible fittings, for example.

The pipe fitting comprises a body 11 in which seatings 12 are present for receiving pipe ends (one of said pipes, denoted by 13, being diagrammatically shown in the figure). Electric heating windings 14 are buried at the seatings 12 and they are connected to terminals 15, 16 external to the pipe fitting.

Advantageously, the winding-incorporating pipe fitting portions are made in the form of cylindrical supports or sleeves 17 that are produced separately, provided with an electric winding (wound around the outer surface thereof, and/or at least partly incorporated thereinto) and then in turn incorporated into the pipe fitting body during formation of the body itself.

Such a structure and its manufacturing technique substantially closely follow that of normal heat-fusible pipe fittings.

Unlike such normal heat-fusible pipe fittings, the inner surface of seatings 12 for receiving the pipe ends is made of a material capable of chemically reacting with the pipe surface in contact with said material when heated beyond a given temperature (100–120° C., for example) which is greater than the temperature of normal use, so as to obtain an adhesion with the pipe surface. The reaction temperature is reached by making an appropriate electric current run through the electric winding by means of a known power supply apparatus connected to terminals 15, 16. The power supply apparatus, not shown, substantially is of a known type used for traditional heat-fusible sleeves. In other words, heat produced by passage of an electric current through an electric resistor formed of the conductor wires of windings 14 is utilized for triggering a chemical reaction between an adhesive layer incorporated into the pipe fitting and the material forming the outer surface of the pipe.

Advantageously, the whole support 17 can be made of the adhesive material or an appropriate mixture containing the adhesive material. For example, the adhesive material can be a polyolefin functionalized for developing a covalent bond with the pipe and pipe fitting material, used by itself or with addition of a suitable additive, and mixed with a polyolefin or/and a polyketone to furnish an appropriate mechanical consistency. This type of adhesive, causing adhesion of the materials through development of covalent bonds, is also known as reactive adhesive. A known type of reactive adhesive for polyamide is ADMER NF 310E. During the chemical reaction, the adhesive of the support reacts with both the material of the pipe fitting body and that of the pipe, forming an indissoluble link with both of them. Therefore, before the reaction it is not necessary for the support 17 to be steadily and sealingly connected to the pipe fitting. It is only sufficient for the support to be secured to the pipe fitting to such an extent that an accidental slipping off of same or unacceptable movements relative to the pipe fitting body are avoided. An appropriate connection for the purpose can merely be a mechanical one, formed with an appropriate conformation (provided with undercuts 18 disposed in an axial direction, for example) of the surfaces of the pipe fitting body and the support 17 in mutual contact, as it is obvious for a person skilled in the art. This connection may consist of an anchoring obtained by moulding the pipe fitting body upon the preformed supports 17.

If the winding wire is laid on the outer surface of the sleeve (formed with appropriate seatings for receiving the wire, for example), the irregular surface thus achieved may be sufficient for ensuring the necessary anchoring of the sleeve to the pipe fitting body.

At this point it is apparent that the intended purposes are reached by supplying pipe fittings enabling a greater flexibility of use than traditional heat-fusible pipe fittings, although the practical and tested technique of an electric heating for a quick connection between a pipe fitting and a pipe is used.

A wide selection of materials forming the pipe fitting and the pipe is allowed with pipe fittings in accordance with the invention. For instance, it has been found particularly advantageous for the pipe fitting body to be made of a material resistant to hydrocarbons (an aliphatic polyketone having a perfectly alternate structure, alloy of polyamides, polypropylene for example). The pipe may also be of the multi-layered type, having an inner layer of a material resistant to hydrocarbons and an outer layer of polyethylene. Adhesion of the sleeve to the pipe and pipe fitting prevents any possibility of fluid seepage between the interfaces.

Obviously the above description of an embodiment applying the innovatory principles of the present invention is given for purposes of illustration only and therefore must not be considered as a limitation of the scope of the invention as herein claimed. For example, as already pointed out above, the pipe fitting shape can be of any kind.

What is claimed is:

1. A pipe fitting for pipelines comprising
   a body made of a first material,
   at least one seating in said body for receiving an end of a pipe to be coupled made of a second material, different from said first material,
   a seating surface of said at least one seating for coming into contact with a surface of the pipe end,
   said seating surface being adapted to support the end of the pipe to be coupled to said body and being adapted to cover an entire end area of the pipe to be coupled to said body,
   said at least one seating being entirely composed of a material including at least a portion of a reactive adhesive material having a chemical adhesion reaction on reaching of a predetermined temperature,
   an electric winding for heating the reactive adhesive material of said at least one seating when an electric current passes therethrough so that said predetermined temperature is reached,
   the at least one seating, including said seating surface, being formed as a sleeve incorporating the electric winding at least partly, and the sleeve, in turn, being anchored in the body so that said sleeve, upon reaching said predetermined temperature chemically reacts and chemically bonds with said body and is adapted to chemically react with and chemically bond with the end of the pipe, forming an indissoluble chemical adhesive link with said body and is adapted to form an indissoluble chemical adhesive link with the end of the pipe.

2. A pipe fitting as claimed in claim 1, wherein the sleeve is entirely composed of a mixture containing the reactive adhesive material and at least one of a polyolefin and a polyketone.

3. A pipe fitting as claimed in claim 1, wherein the reactive adhesive material is a functionalized polyolefin developing covalent bonds with said body on heating to said predetermined temperature.

4. A pipe fitting as claimed in claim 1, wherein the body is made of an aliphatic polyketone having a perfectly alternate structure.

5. A pipe fitting as claimed in claim 1, wherein the electric winding, in order to be power supplied, has its ends connected to connecting terminals disposed on an outer surface of the body.

6. A pipe fitting for pipelines comprising
   a body made of a first material,
   at least one seating in said body for receiving an end of a pipe to be coupled made of a second material, different from said first material,
   a seating surface of said at least one seating for coming into contact with a surface of the pipe end,
   said seating surface being adapted to support the end of the pipe to be coupled to said body and being adapted to cover an entire end area of the pipe to be coupled to said body,
   said at least one seating being entirely composed of a material including at least a portion of a reactive adhesive material having a chemical adhesion reaction on reaching of a predetermined temperature,
   an electric winding for heating the reactive adhesive material of said at least one seating when an electric current passes therethrough so that said predetermined temperature is reached,
   the at least one seating, including said seating surface, being formed as a sleeve incorporating the electric winding at least partly, and the sleeve, in turn, being located in the body so that said sleeve, upon reaching said predetermined temperature chemically reacts and chemically bonds with said body and is adapted to chemically react with and chemically bond with the end of the pipe, forming an indissoluble chemical adhesive link with said body and is adapted to form an indissoluble chemical adhesive link with the end of the pipe,
   said sleeve having an internal surface completely covered by the pipe end when the pipe end is inserted in the pipe fitting to prevent any possible fluid seepage from the pipe contacting said sleeve.

7. A pipe fitting as claimed in claim 6, wherein said sleeve abuts a shoulder of said pipe fitting and the pipe end abutting said shoulder when inserted in the pipe fitting so as to isolate said interior surface of said sleeve from an interior surface of the pipe end.

* * * * *